(12) United States Patent
Bhatnagar

(10) Patent No.: US 12,050,861 B2
(45) Date of Patent: Jul. 30, 2024

(54) METHOD AND SYSTEM FOR TEMPLATE RECONCILIATION

(71) Applicant: Klaviyo Inc., Boston, MA (US)

(72) Inventor: Shresth Bhatnagar, Boston, MA (US)

(73) Assignee: Klaviyo Inc., Boston, MA (US)

( * ) Notice: Subject to any disclaimer, the term of this patent is extended or adjusted under 35 U.S.C. 154(b) by 7 days.

(21) Appl. No.: 17/745,875

(22) Filed: May 17, 2022

(65) Prior Publication Data

US 2023/0376680 A1    Nov. 23, 2023

(51) Int. Cl.
*G06F 40/186* (2020.01)
*G06F 16/21* (2019.01)
*G06F 16/22* (2019.01)
*G06F 16/28* (2019.01)

(52) U.S. Cl.
CPC .......... *G06F 40/186* (2020.01); *G06F 16/211* (2019.01); *G06F 16/22* (2019.01); *G06F 16/282* (2019.01)

(58) Field of Classification Search
CPC ...... G06F 40/186; G06F 16/211; G06F 16/22; G06F 16/282
USPC ....................................................... 715/234
See application file for complete search history.

(56) References Cited

U.S. PATENT DOCUMENTS

| 7,213,202 B1 | 5/2007 | Kagle |
| 7,257,772 B1 | 8/2007 | Jones et al. |
| 7,287,218 B1 | 10/2007 | Knotz et al. |
| 8,250,470 B2 | 8/2012 | Takashima |
| 8,484,156 B2 | 7/2013 | Hancsarik et al. |
| 9,237,233 B2 | 1/2016 | Soundar |
| 10,248,657 B2 | 4/2019 | Prahlad et al. |
| 10,701,005 B2 | 6/2020 | Nutt et al. |
| 2005/0273705 A1 | 12/2005 | McCain |
| 2006/0225040 A1* | 10/2006 | Waddington ............. G06F 8/71 717/122 |
| 2009/0006936 A1* | 1/2009 | Parker ................. H04L 12/1813 715/200 |
| 2009/0125518 A1* | 5/2009 | Bailor .................... G06Q 10/10 |
| 2012/0042239 A1 | 2/2012 | O'Brien |
| 2013/0124956 A1* | 5/2013 | Hatfield ................ G06F 40/197 715/211 |
| 2014/0282125 A1 | 9/2014 | Duneau |
| 2016/0132472 A1 | 5/2016 | Campbell et al. |
| 2017/0019697 A1 | 1/2017 | Hundemer |

(Continued)

OTHER PUBLICATIONS

Lindholm (A Three-way Merge for XML Documents, published Oct. 2004, pp. 1-10) (Year: 2004).*

(Continued)

*Primary Examiner* — Shahid K Khan
*Assistant Examiner* — Ahamed I Nazar

(57) ABSTRACT

Methods and systems for improved and efficient template reconciliation are disclosed. By comparing the original template with the proposed modified template, the template management system can determine the minimally necessary modifications in a relational database to implement all changes and automatically generate scripts to update the template in a short amount of time. The present subject can improve computer and network efficiency by eliminating constant and in-between modifications of the template. It also saves computing resources by avoiding the complete deletion and replacement of a template in the relational database.

18 Claims, 20 Drawing Sheets

(56) References Cited

U.S. PATENT DOCUMENTS

| | | |
|---|---|---|
| 2018/0081868 A1 | 3/2018 | Willcock et al. |
| 2019/0228063 A1 | 7/2019 | El-Sherif et al. |
| 2021/0389962 A1 | 12/2021 | Li |
| 2023/0298368 A1* | 9/2023 | Berger .................. G06Q 10/10 |

OTHER PUBLICATIONS

Lindholm (A 3-way Merging Algorithm for Synchronizing Ordered Trees—the 3DM merging and differencing tool for XML, published Sep. 2001, pp. 1-205) (Year: 2001).*

Lindholm (XML Three-way Merge as a Reconciliation Engine for Mobile Data, published Sep. 2003, pp. 1-5) (Year: 2003).*

* cited by examiner

Template 600 in a Relational Database

Body

| id | settings |
|---|---|
| 001 | {} |

Section

| id | settings | body | position |
|---|---|---|---|
| 001 | {} | 001 | 0 |
| 002 | {} | 001 | 1 |

Row

| id | settings | section | position |
|---|---|---|---|
| 001 | {} | 002 | 0 |
| 002 | {} | 002 | 1 |

Column

| id | settings | row | position |
|---|---|---|---|
| 001 | {} | 001 | 0 |
| 002 | {} | 001 | 1 |

Block

| id | settings | column | position |
|---|---|---|---|
| 001 | {} | 002 | 2 |
| 002 | {} | 002 | 1 |
| 003 | {} | 002 | 0 |
| 004 | {} | 002 | 3 |

*FIG. 6C*

METHOD AND SYSTEM FOR TEMPLATE RECONCILIATION

TECHNICAL FIELD

The present subject matter relates to systems and methods for data integration, modification, and update of an electronic mail template. More specifically, the present subject matter relates to efficiently modifying a template in the context of computer-aided management of electronic mail. The present subject matter also relates to systems and methods for improving computer and network speeds.

BACKGROUND

Digital marketing has become a powerful way to promote a business's products and services to its customers. It helps the customers to be aware of the business's latest offerings. Among digital marketing's various tools, computer-compiled marketing emails can directly deliver the most relevant content to a customer. Such emails can be generated based on modifying a template email according to the specific offering, the customer's preference, or other factors. For example, marketing emails can be personalized based on the customer's past interaction with the brand.

To achieve that, the template email needs to be modified to add personalized content. Traditionally, when a client device makes a change in an email template, the editing device immediately sends a request to change the template data in a database that stores and manages the email template. This "bit-by-bit" change process can consume a substantial amount of the computing power on the server, which slows down the network and system's performance.

Another approach is using a save request to implement all changes at one time. However, upon receiving the save request for the modifications, the server first deletes the previous version of the template data and rewrites or replaces it with the new template data that reflects the changes. In this approach, even though the modifications are trivia, the system consumes unnecessary computing resources by the complete deletion and recreation of the whole template data.

As such, there are a lot of areas for improving the computing system performance in the modifications of email templates via an improved approach.

SUMMARY OF THE INVENTION

The present subject matter describes improved methods for template modification via a computer network. The system can continuously receive multiple modification requests of the original template continuously over a period of time without implementing them. Upon determining a triggering event, the system can compare the template with the modified template with all requested modifications. The comparison would derive one or more simplified modifications that can be applied in a relational database to implement all changes, which are the minimal operations to execute the changes. The system can then apply the simplified modifications directly in the database to update the original template, instantaneously or in a brief amount of time.

Compared with the prior template editing approaches, the present subject matter can improve computer and network efficiency by eliminating continuous and frequent consumption of processing power resulting from constant and in-between modifications of the template. It also saves computing resources by avoiding complete deletion and replacement of a template in a database.

In addition, by directly comparing the original template with the relatively final, modified version, the system can enumerate the simplest or the least operations to update the original template in one batch in the relational database. These minimally necessary operations can remove unnecessary or redundant server operations, thus rendering the system more agile and efficient.

A computer implementation of the present subject matter comprises receiving, at a template management server, a template comprising one or more components in a relational database from a client device, receiving, at a triggering event, an updated template from the client device, comparing the template with the updated template, determining one or more modifications associated with the one or more components of the template, and synchronizing, in the relational database, the template with the updated template by applying the one or more modifications to the one or more components of the template. According to some embodiments, the one or more modifications are the least operations to synchronize the template with the updated template in the relational database. Furthermore, the modifications comprise at least one of an addiction, a deletion, or a move of a component in the relational database.

According to some embodiments, the one or more components comprise first-level components, second-level components, and/or third-level components in a hierarchical schema. The template management server can compare the respective components of the template and the updated template at each hierarchical level.

According to some embodiments, the template management system can generate operations that can be applied in the relational database to update the one or more components of the template with the modifications. According to some embodiments, the system can generate a modification list comprising operations that can be applied in the relational database to implement the one or more modifications, and instantaneously synchronize the template with the updated template by applying the modification list to the template in the relational database.

According to some embodiments, the template management system can generate, for example, nested JSON (JavaScript Object Notation) data structures based on the template and the modified template, and the comparison of the template and the modified template can be conducted through the JSON data structures. In addition, other nested data structures can be adopted to implement the present subject matters.

According to some embodiments, the triggering event of the present subject matter is a save request received by the template management server. As an alternative, the triggering event can be associated with a predetermined period of time. As another alternative, the triggering event can be a major modification of the template. According to some embodiments, the triggering event can be determined by a hybrid of the aforementioned factors higher than a threshold. According to some embodiments, the threshold value can be empirically predetermined or dynamically adapted.

According to some embodiments, the system can store and transmit the synchronized template, e.g., the template that has been updated, to the client device so that it can display and operate on the latest version of the template.

Another computer implementation of the present subject matter comprises receiving, at a template management server, a template comprising one or more components in a relational database, determining a triggering event for updating the template, receiving, at the triggering event, an updated template from the client device, comparing the template with the updated template, determining one or more modifications in the relational database associated with the one or more components of the template, and synchronizing, in the relational database, the template with the updated template by updating the one or more components of the template with the one or more modifications. Furthermore, the one or more modifications are the least summarized operations to synchronize the template with the updated template in the relational database.

According to some embodiments, the system can enable multi-client editing of the same template. For example, the template is received from a first client device, and the updated template is received from a second client device. After the system applies the summarized modifications in the relational database to the template, the system can transmit the updated template to the first client device and the second client device.

According to some embodiments, the template comparison and operation generation can be performed by a client device. The client device can: receive a template comprising one or more components in a relational database, receive one or more modification requests to change the template, wherein the one or more modification requests generate a modified template, determine a triggering event to implement the one or more modification requests in the relational database, compare, by the client device, the template with the modified template to determine one or more simplified modifications to implement the one or more modification requests, and transmit the one or more simplified modifications to a template management server. The template management server can synchronize, in the relational database, the template by applying the one or more simplified modifications to the one or more components of the template.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 6C shows an exemplary template stored in a relational database, according to one or more embodiments of the present subject matter;

DETAILED DESCRIPTION

The present subject matter pertains to improved approaches for a template management system. Embodiments of the present subject matter are discussed below with reference to FIGS. 1-10.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently updating a template within a relational database. These can be implemented with computers that execute software instructions stored on non-transitory computer-readable media. An improved template management system can have one or more of the features described below.

Figure 1A:
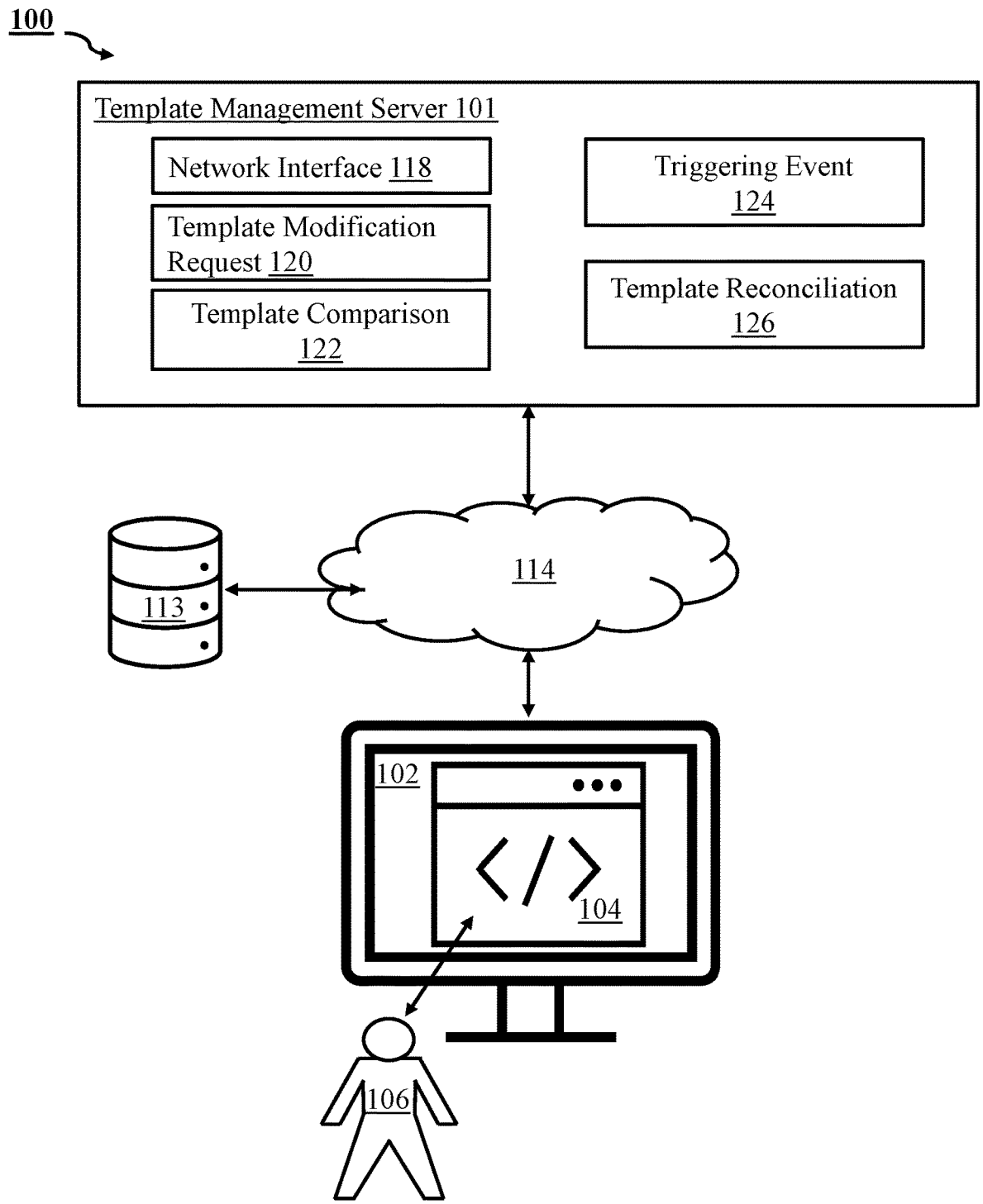
FIG. 1A shows an exemplary diagram of a template management system for template reconciliation, according to one or more embodiments of the present subject matter.

FIG. 1A shows an exemplary diagram of a template management system 100 for efficiently managing a template according to the present subject matter. In the present disclosure, a template can be stored a relational database via normalized and related data components or tables, such as body, sections, rows, columns, blocks and sub-blocks.

When being rendered as an email, relevant data of the template can be converted into a computer-compiled HTML web page showing the embedded components, such as sections and blocks. According to some embodiments, a component is a pre-defined structure that can be represented in both the relational database and in the email editor, and which can be rendered into HTML and configured by its display settings and sub-components as well as its content to produce unique HTML when rendered.

For example, a block can be represented in both the relational database and in the email editor. It can be rendered into HTML and configured by its display settings and sub-blocks by a client device. A sub-block is a block-type designed to be located within another block of a specific type; for example, a table block can be a sub-block of a section block, and a table image or table text block (or table header or other table-related blocks) can be sub-blocks of a table block. In another example, a block can be responsible for layout and general configuration but the subblocks are responsible for the display of the specific user products described in the email template.

According to some embodiments, the system can generate JSON data structures based on the template in an encoding process. The JSON data structure can be a serialized nested JSON structure containing the normalized form of the template consisting of related sections, blocks, sub blocks, settings, positions, etc. In addition, other nested data structures can be adopted to implement the present subject matters.

For example, the template data can be rendered as an email template with structures and components in the JSON data structure that can be configured or modified by a computing device or a client device. The template data can be normalized and nested tables comprising components/ blocks, settings/content, and position information for the template. The template, with its data schemas that define the structure and content of it, can be stored in a relational database 113. According to some embodiments, the email template can be marketing emails that can directly deliver relevant content to a customer. These marketing emails can be generated by modifying a template email according to various factors such as the specific offering or the customer's previous behavior data.

As shown in FIG. 1, a user 106 can configure a template 104 via a client device 102, which can communicate with a relational database 113 and a template management server 101 via a network 114. Client device 102 can be a computing device that has at least one input interface for receiving template modification requests and at least one network interface for network connection.

Network 114 can comprise a single network or a combination of multiple networks, such as the Internet or intranets, wireless cellular networks, local area network (LAN), wide area network (WAN), WiFi, Bluetooth, near-field communication (NFC), etc. Network 114 can comprise a mixture of private and public networks or one or more local area networks (LANs) and wide-area networks (WANs) that may be implemented by various technologies and standards.

Template management server 101 can comprise a number of modules or units to implement functions of the present subject matter. According to some embodiments, template management server 101 can implement functions related to network interface 118, template modification requests 120, template comparison 122, triggering event 124, and template reconciliation 126.

According to some embodiments, upon receiving a number of template modification requests 128 from client device 102, template management server 101 can withhold any changes in the relational database 113 until a triggering event 124 is determined. For example, triggering event 124 can be an explicit save request sent by user 106, e.g., by choosing a save option on the display. Triggering event 124 can also be an implied save request such as a predetermined amount of time, e.g., every 5 or 10 minutes. In addition, triggering event 124 can also be a major modification of the template that is predetermined or dynamically determined by the system. For example, a major modification can be a series of modifications that have operated on more than 30% of the components. According to some embodiments, triggering event 124 can be determined by a hybrid of the aforementioned factors that is higher than a threshold, wherein the threshold value can be empirically predetermined or dynamically adapted.

After determining a triggering event, template management server 101 can, via template comparison 122, compare the original template 104 with a modified template that can be generated by the multiple modification requests, i.e., the proposed updated template. According to some embodiments, the system can generate nested data structures, such as JSON data structures, based on the original template and the modified template in the relational database and compare the nested data structures for differences. The comparison can be conducted at each hierarchical level of the respective components in the template and the modified template. Furthermore, template management server 101 can generate sub tree references to represent the nested component structure.

According to some embodiments, the system can select a respective first-level component or node, e.g., a body, from the original template and the modified template, and compare the bodies in multiple aspects, including its dependency, existence, content, position, etc. After the first-level comparison, if needed, the system can select a respective second-level component, e.g., a section, from the two templates, and compare the sections in different aspects. The process can continue until the last-level components are respectively compared. According to some embodiments, at each component level, the system can compare a subtree reference of an original template with a selected root node or a subtree reference of the updated template.

By the level-to-level comparison, template management server 101 can derive one or more simplified modifications in the relational database to implement the one or more modification requests. According to some embodiments, a modification list that comprises these simplified modifications can be generated. The simplified modifications can be the least operations to synchronize the template with the modified template. For example, during a back-and-forth editing process, a block can be added to a template, then momentarily deleted, and later added back. In a conventional template editing approach, each temporary operation, i.e., adding, deleting and re-adding of the block, triggers a corresponding operation of the template management server 101 to revise and update template 104 in the database.

By contrast, template management server 101 of the present subject matter can withhold the modification requests of template 104 in the database until a triggering event for saving is detected. Upon determining a triggering event, by directly comparing the original template with the final, modified version, template management server 101 can derive simplified modifications, i.e., an addition operation in the relational database only, from the multiple modification requests. This can eliminate the unnecessary deletion operation by the server in the back-and-forth edition, thus improving the computing and network efficiency.

In addition, unlike the constant modifications of the prior approach, template management server 101 can update the original template via instantaneous and collective modification operations, which can optimize the computer and network efficiency. Furthermore, during template reconciliation 126, the system can automatically generate database operations to instantaneously update templet 104 with the one or more simplified modifications.

According to some embodiments, the system can enable joint editing of the template by more than one editor or client device. For example, the original template can be sent from a first client device, whereas the modification requests can be sent from a second client device. According to some embodiments, after the template is updated, the system can transmit the modified template to the first client device and the second client device.

Figure 1B:
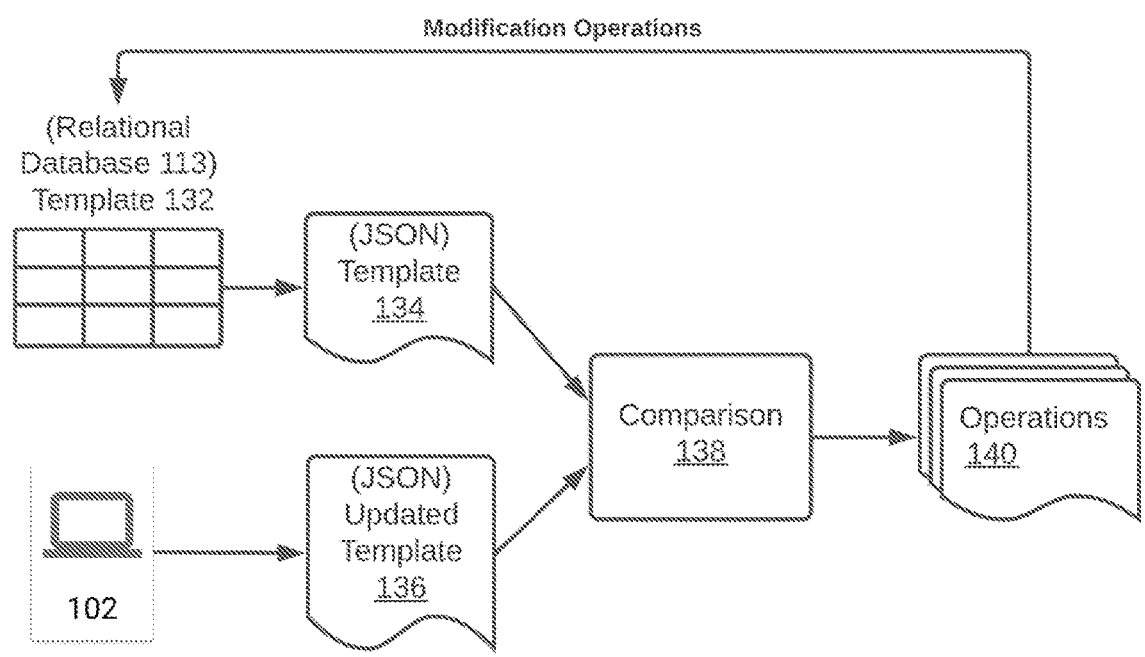
FIG. 1B shows another exemplary diagram of a template management system for template reconciliation, according to one or more embodiments of the present subject matter.

FIG. 1B shows another exemplary diagram of a template management system 150 for template reconciliation. A template 132 can be stored in a relational database 113 in the format of one or more normalized and relational data tables. The client device 102 can edit the template 132 by configuring the nested data structure, such as updated JSON data structure 136 that contains the updated template consisting of nested components. Upon receiving a triggering event as described herein, the template management system 150 can generate a JSON data structure 134 representing the original template consisting of the original, nested components. By the comparison 138 of the original JSON data structure 134 with the updated JSON data structure 136, the server can generate one or more database operations 140, e.g., delete, move, add, edit, etc., so that they can be directly applied to the original template 132 for the update.

Figure 2:
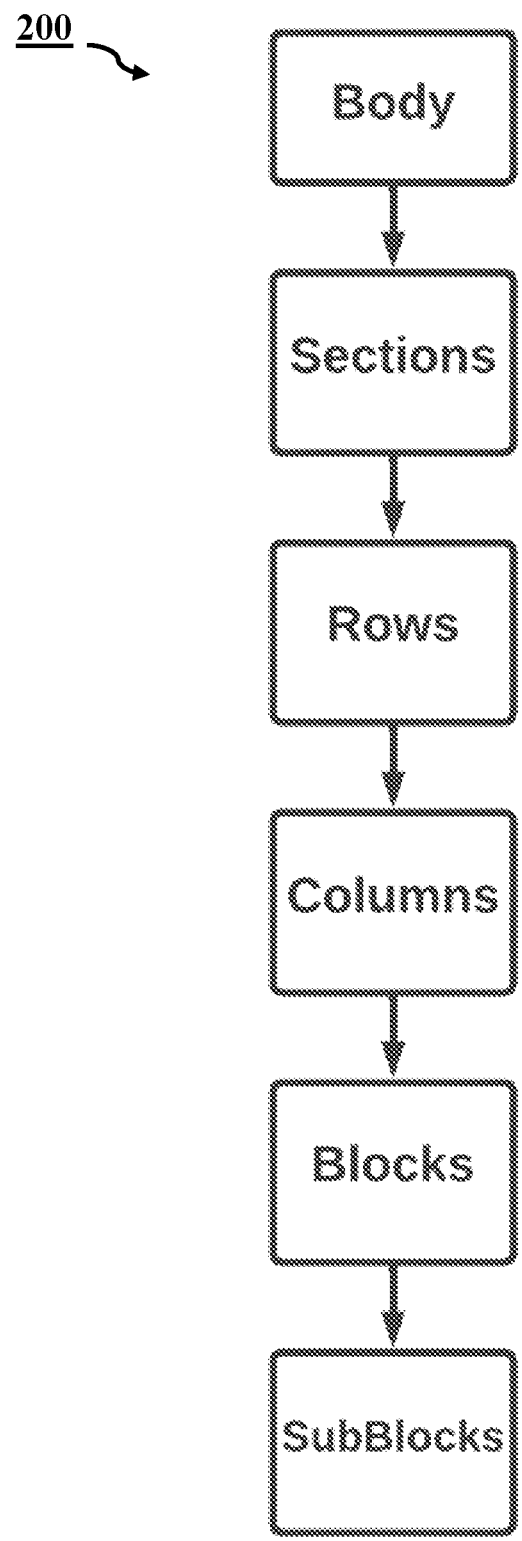
FIG. 2 shows exemplary hierarchical components of a template, according to one or more embodiments of the present subject matter.

FIG. 2 shows exemplary hierarchical components of a template. A template can be stored in a relational database via normalized and related data components, such as body, sections, rows, columns, blocks and sub-blocks. The template data can be normalized and nested tables comprising components/blocks, settings/content, and position information for the template.

When being rendered as an email, relevant data of the template can be converted into a computer-compiled HTML web page showing the embedded components, such as sections and blocks. According to some embodiments, a component is a pre-defined structure that can be represented in both the relational database and in the email editor, and which can be rendered into HTML and configured by its display settings and sub-components as well as its content. According to some embodiments, the template data can be rendered as an email template in the JSON data structure that can be configured or modified by a computing device or a client device.

As illustrated in FIG. 2, an email template 200 can comprise hierarchical components or nodes in a relational database. For example, a first-level component can be a body, which can comprise a section as a second-level component. The section can further comprise a row as a third-level component. Furthermore, the row can comprise a row as a fourth-level component. The row can comprise a block as a fifth-level component, which can further comprise a subblock as a sixth-level component. At each level, one or more components can depend on the previous-level component(s).

According to some embodiments, the relational database can be a MySQL database or any relational database. Each component of the template can correspond to one or more related tables, which defines the structure and content of the component, as well as its relationship with other components.

Figure 3A:
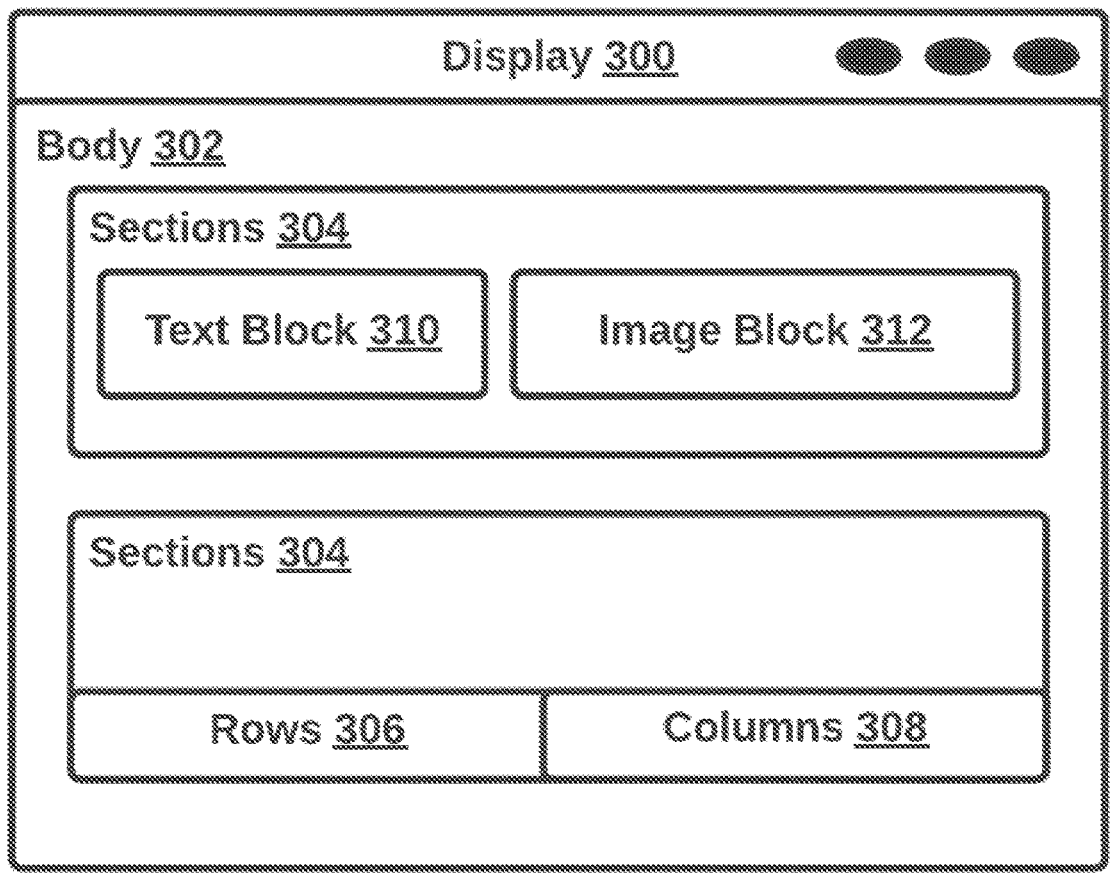
FIG. 3A shows an exemplary layout of a template with some hierarchical components, according to one or more embodiments of the present subject matter.

FIG. 3A shows an exemplary layout 301 of a template with some hierarchical components as shown in FIG. 2. A display 300 can show a template email with a first-level body 302. The body 302 can comprise two second-level sections 304, wherein one section 304 can further comprise third-level rows 306. The row 306 can further comprise fourth-level column 308. The other section 304 can comprise unshown rows and columns, which further comprise fifth-level text block 310 and image block 312. According to some embodiments, the fifth-level block can further comprise six-level subblocks (not shown).

Figure 3B:
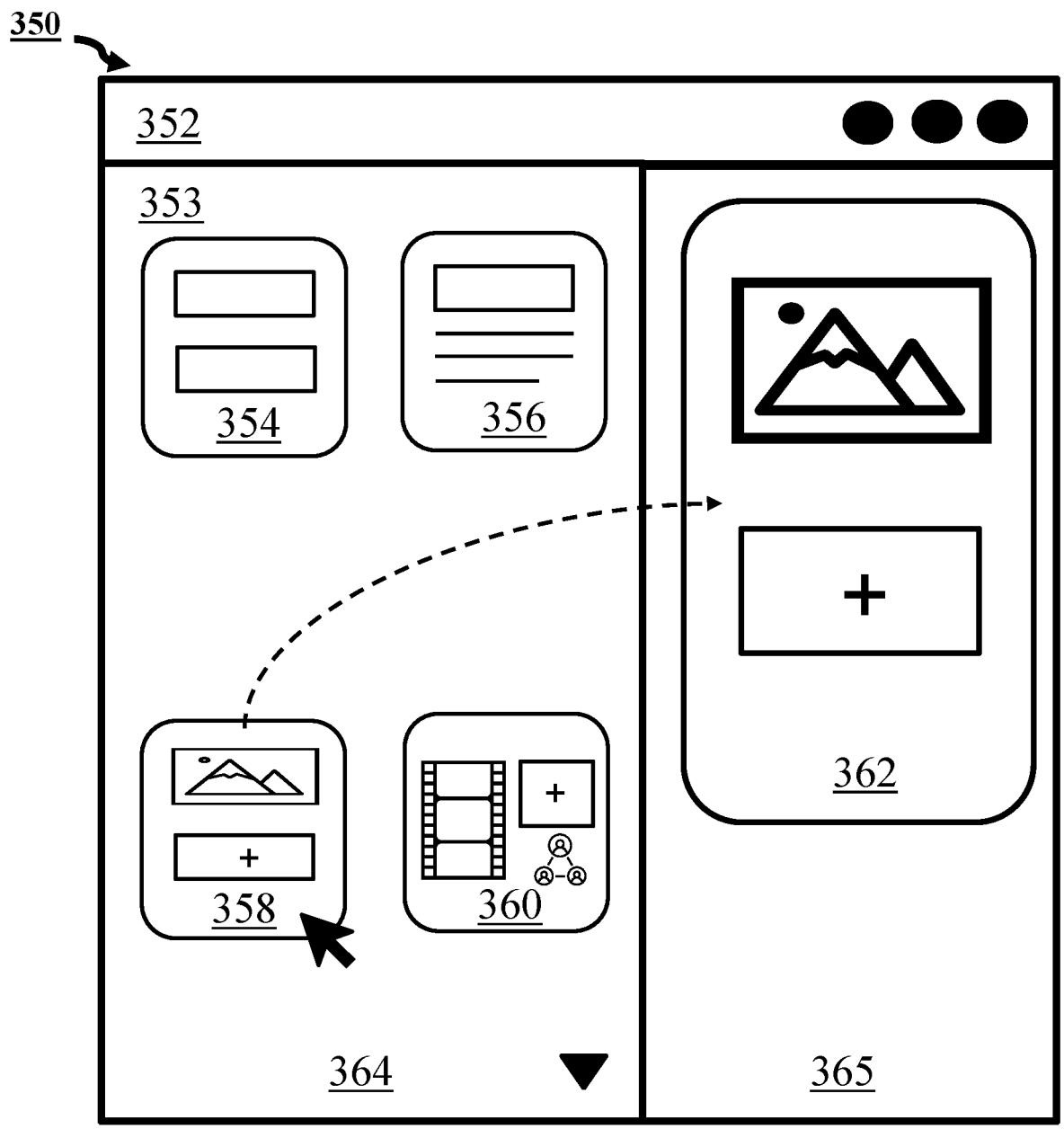
FIG. 3B shows some exemplary updates of a template, according to one or more embodiments of the present subject matter.

FIG. 3B shows some exemplary modifications of a template 350 by a client device. The template 350 can be an email template that is undergoing modifications to suit its purpose. The template can be automatically generated by the system and saved in a folder that is available for the user. The template can also be generated by the user based on a previous email.

As shown in FIG. 3B, a display 352 can comprise a body 353 that can be divided into two sections 364 and 365. Section 364 can further comprise two rows as shown in FIG. 3B. The first row can comprise two columns with its respective blocks 354 and 356. The second row can comprise additional two columns with its respective blocks 358 and 360. Section 365, by contrast, has one image block embedded in column 362.

According to some embodiments, a user, via a client device, can change template 350 by directly edit, delete, add, update or move any components such as the blocks, columns, row, sections or body. For example, during a modification session lasting for ten minutes, the user can first add text in block 358, remove an image subblock in block 358, and then move block 358 to column 362. Each operation on block 358, e.g., editing text, removing the image, and moving the block, leads to a modification request from the client's device to a template management server via a network.

Upon receiving the modification requests, the server can halt initiating the modifications in the database until a triggering event is determined. For example, after a predetermined amount of time, e.g., 10 mins, the server can compare, at leave component level, the original template with a proposed modified template in JSON or in the nested data structure resulting from the modification request. By comparison, the server can generate a list of modification list in the database. Here, the modification list can comprise editing text, removing the image, and moving the block, which are the same as the original modification requests. According to some embodiments, the modification list can comprise simplified or fewer modifications when the original modification requests are redundant or comprise canceled operations.

Figure 4A:
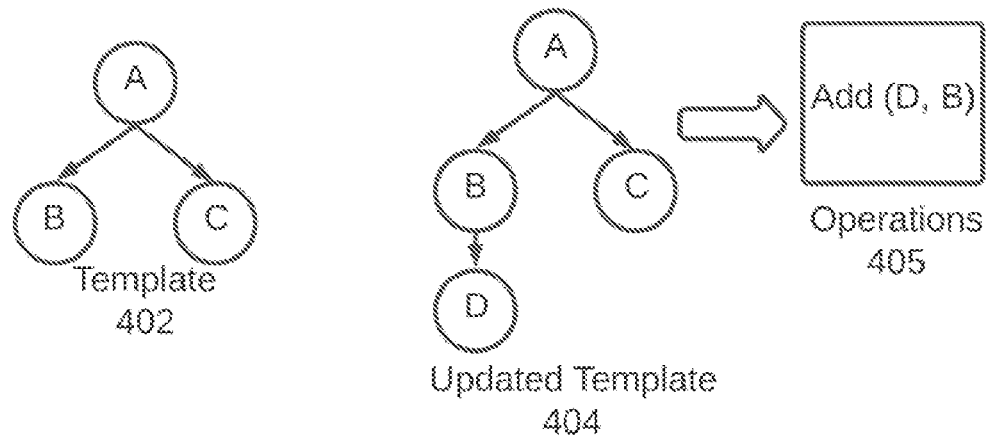
FIG. 4A-4F show some exemplary processes for template reconciliation, according to one or more embodiments of the present subject matter.

FIG. 4A-4E show some exemplary processes for template reconciliation. As shown in FIG. 4A, the original template 402 can comprise a body A with sections B and C. Upon determining a triggering event, e.g., a save request, the server can compare the updated template or modified template 404 with the original template 402 in JSON scripts or any nested data structures to determine database operations 405, i.e., add a row D to the section B, which is necessary to update original template 402 in the relational database.

Figure 4B:
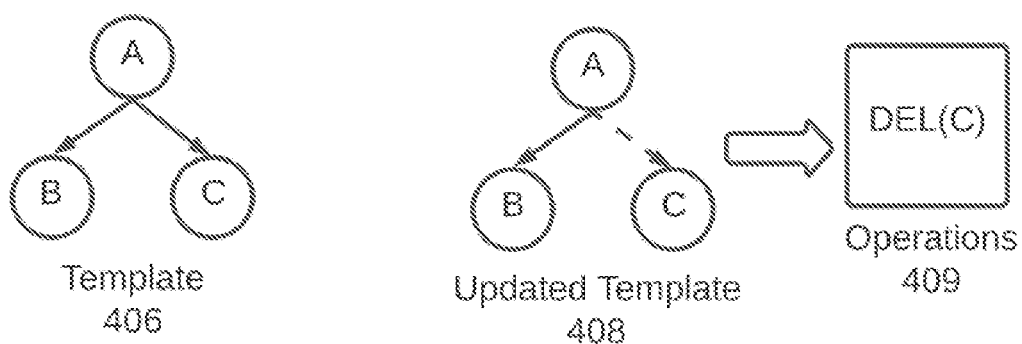

In FIG. 4B, the original template 406 can also comprise a body A with sections B and C. Upon determining a triggering event, e.g., a predetermined amount of time, the server can compare the updated/modified template 408 with template 406 in JSON scripts to derive the necessary database operations 409, i.e., delete section C of template 406.

Figure 4C:
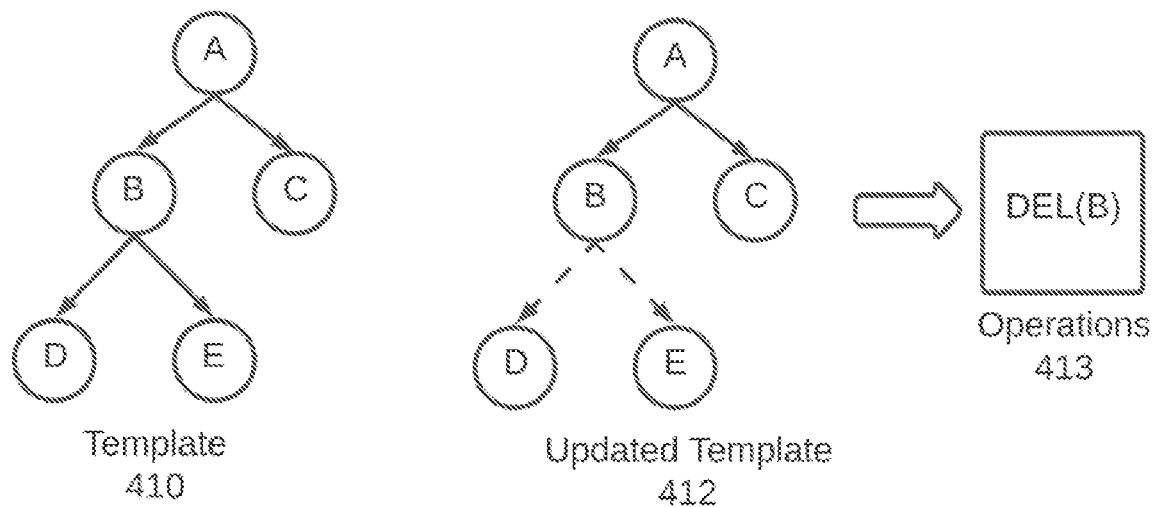

In FIG. 4C, the original template 410 can also comprise a body A with sections B and C. Section B can further comprise rows D and E. Upon determining a triggering event, e.g., a major modification or a predetermined modification, the server can compare the updated/modified template 412 with template 410 in JSON scripts to derive minimally necessary database operations 413, i.e., delete section B of template 410, which implies deletion of rows D and E.

Figure 4D:
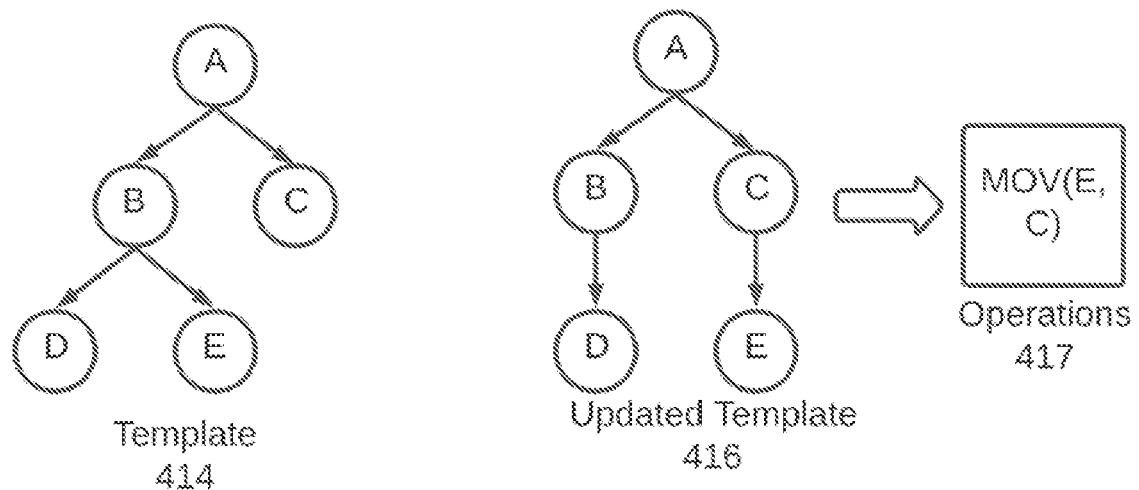

In FIG. 4D, the original template 414 can also comprise a body A with sections B and C. Section B can further comprise rows D and E. Upon determining a triggering event, e.g., a hybrid of several factors that is higher than a threshold, the server can compare the updated/modified template 416 with template 414 in JSON to derive minimally necessary database operations 417, i.e., move row E from section B to section C.

Figure 4E:
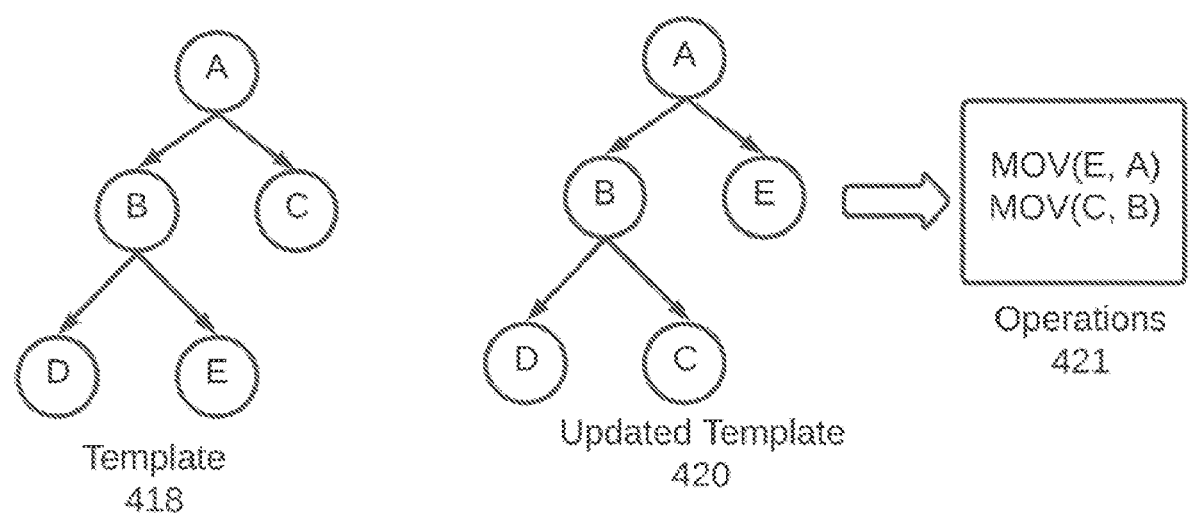

In FIG. 4E, the original template 418 can also comprise a body A with sections B and C. Section B can further comprise rows D and E. Upon determining a triggering event, the server can compare the updated/modified template 420 with template 418 to derive necessary database operations 421, i.e., move row E to become section E under body A, and move row C within section B.

Figure 4F:
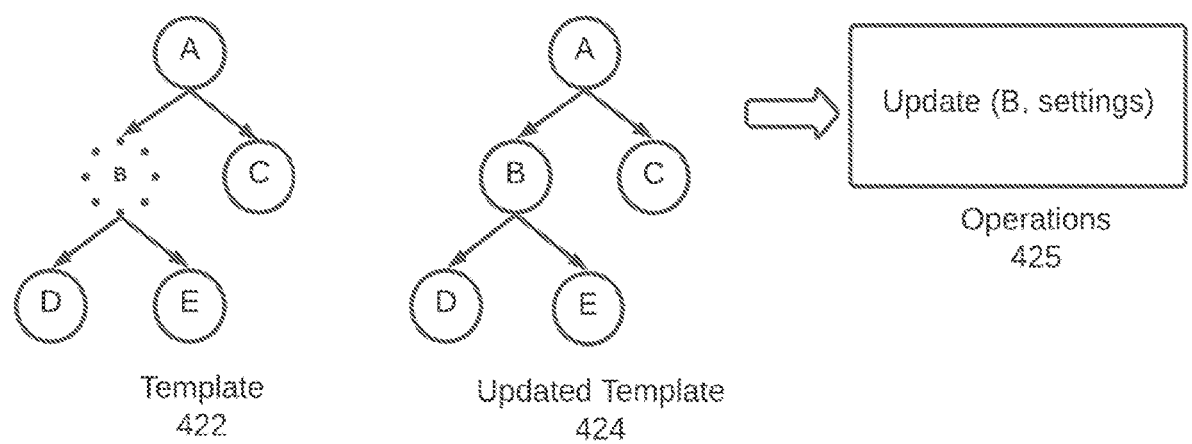

In FIG. 4F, the original template 422 can also comprise a body A with sections B and C. Section B can further comprise rows D and E. Upon determining a triggering event, the server can compare the updated/modified template 424 with template 422 to derive necessary database operations 425, i.e., update Section B's settings, including its content, font, size and color, etc.

Figure 5A:
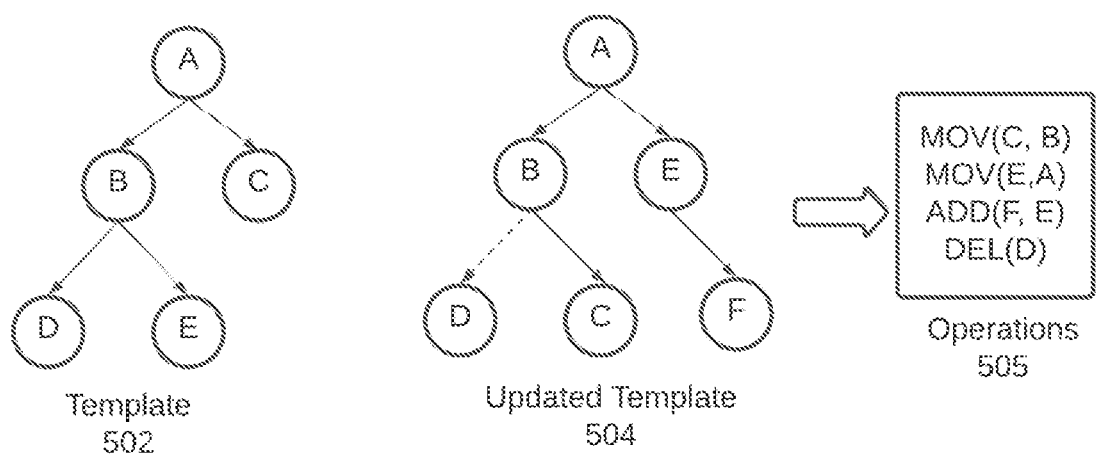
FIG. 5A-5B show some additional exemplary processes for template reconciliation, according to one or more embodiments of the present subject matter.
Figure 5B:
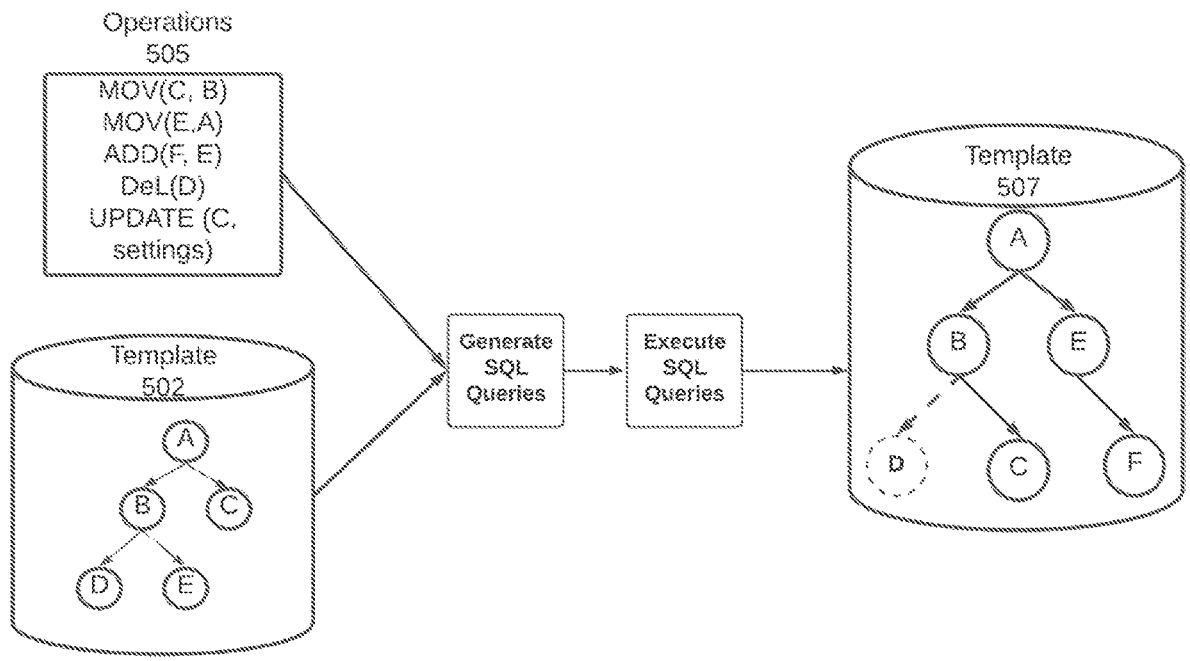

FIG. 5A-5B show some additional exemplary processes for template reconciliation. In FIG. 5A, the original template 502 can comprise a body A with sections B and C. Section B can further comprise rows D and E. Upon determining a triggering event, the server can compare the updated/modified template 504 with template 502 in JSON to derive minimally necessary database operations 505, i.e., move row C to section B, move section E to body A, add row F to section E, and delete row D.

As shown in FIG. 5B, the server can apply database operations 505 to template 502 so that it is modified/updated by a batch of grouped operations in a short amount of time. In particular, after moving row C to section B, moving section E to body A, adding row F to section E, updating section B's settings, and deleting row D, template 502 has been synchronized and resulted in template 507. In particular, the server can generate SQL queries and execute them to apply the changes to generate template 507 in the database.

Figure 6A:
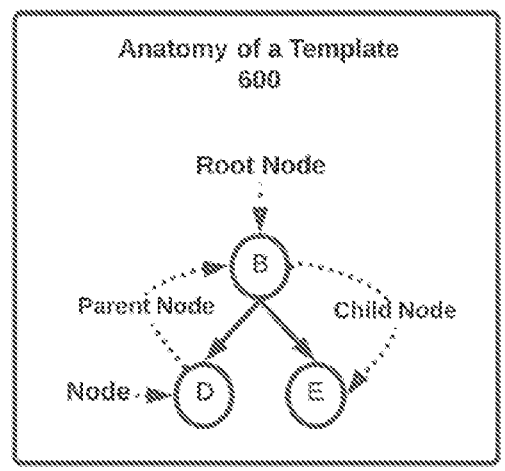
FIG. 6A shows an exemplary anatomy of a template, according to one or more embodiments of the present subject matter.

FIG. 6A shows an exemplary anatomy 600 of a template. According to some embodiments, the node B or component B can be a root node, a parent node, or a first-level component, whereas nodes D and E can be child nodes that depend on the node B.

Figure 6B:
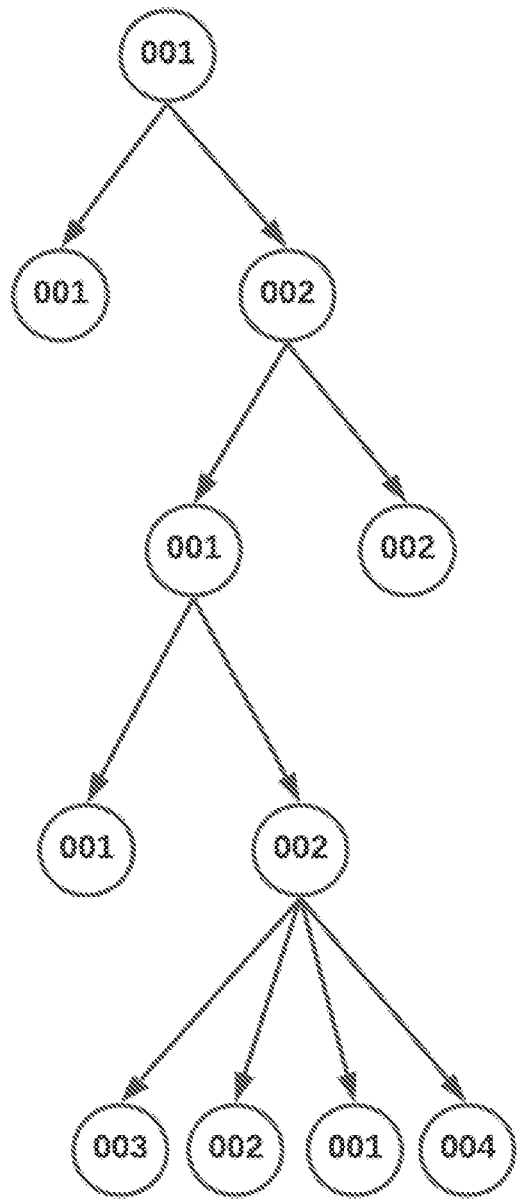
FIG. 6B shows an exemplary representation of a template, according to one or more embodiments of the present subject matter.

FIG. 6B shows an exemplary anatomy 600 of a template and FIG. 6C shows the template stored in a relational database. As shown in FIG. 6B, template anatomy 600 can comprise a number of components or nodes, including a body 001 that further comprises a section 001 and a section 002. Section 002 can comprise a row 001 and a row 002. Row 001 can further comprise a column 001 and a column 002, which comprise four blocks 003, 002, 001 and 004, respectively.

FIG. 6C is the relational database of the template as shown in FIG. 6B. As shown in this figure, the relational database of the template can comprise a number of related normalized data tables. For example, body 001 has an ID 001 and its corresponding settings, which can define the color, size, font, and content of the body. Body 001 can comprise section 001 and section 002, each of which has its respective settings and position within body 001, i.e., position 0 and position 1. Section 002 can comprise row 001 and row 002, each of which has its respective settings and positions within section 002. Row 001 can comprise columns 001 and 002 with its respective settings and positions within the row. In addition, column 002 can comprise four individual blocks 001, 002, 003 and 004, which are located in its corresponding position 2, 1, 0 and 3. According to some embodiments, the generated simplified modifications of the present subject matter are database operations that can configure or change the relationship, structure and content of such data tables, as shown in FIG. 6C.

Figure 6D:
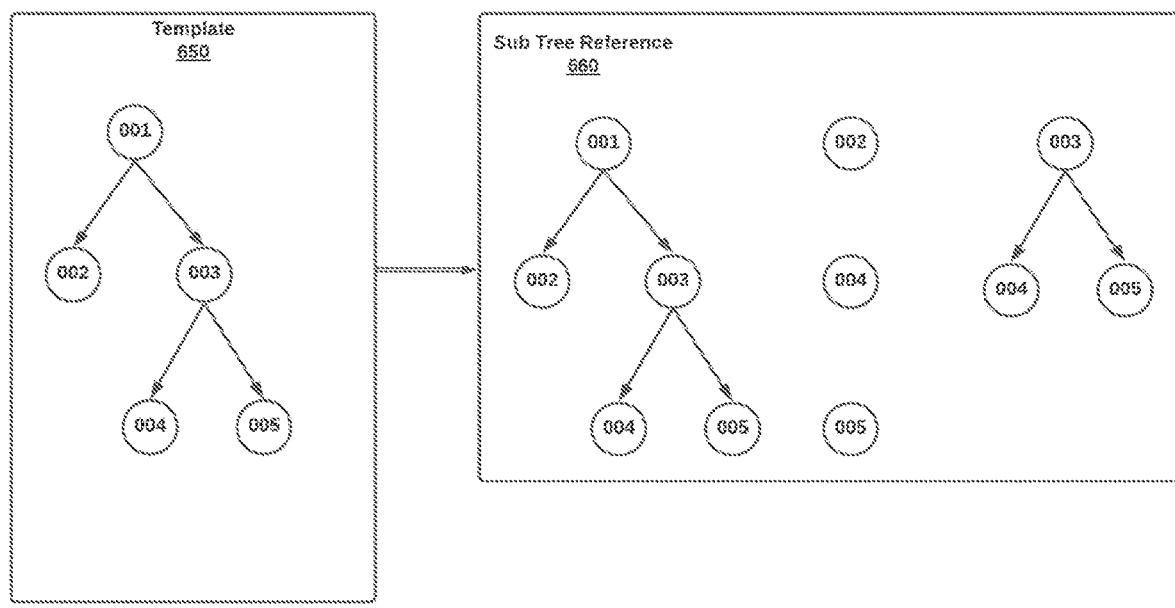
FIG. 6D shows an exemplary process of generating sub tree references of a template, according to one or more embodiments of the present subject matter.

FIG. 6D shows an exemplary process of generating sub tree references of a template 650. A subtree of a node or a component is defined as a tree which is a child of a node. Subtree references 660 can represent, sort or manage the component dependency relationships of template 650 within the relational database. As shown in this Figure, a subtree of node or component 001 is {002, 004, 005}, whereas the subtree of node 003 is {004, 005}. As described herein, the subtree references can enable a thorough and efficient comparison of the original template and the updated template.

Figure 7A:
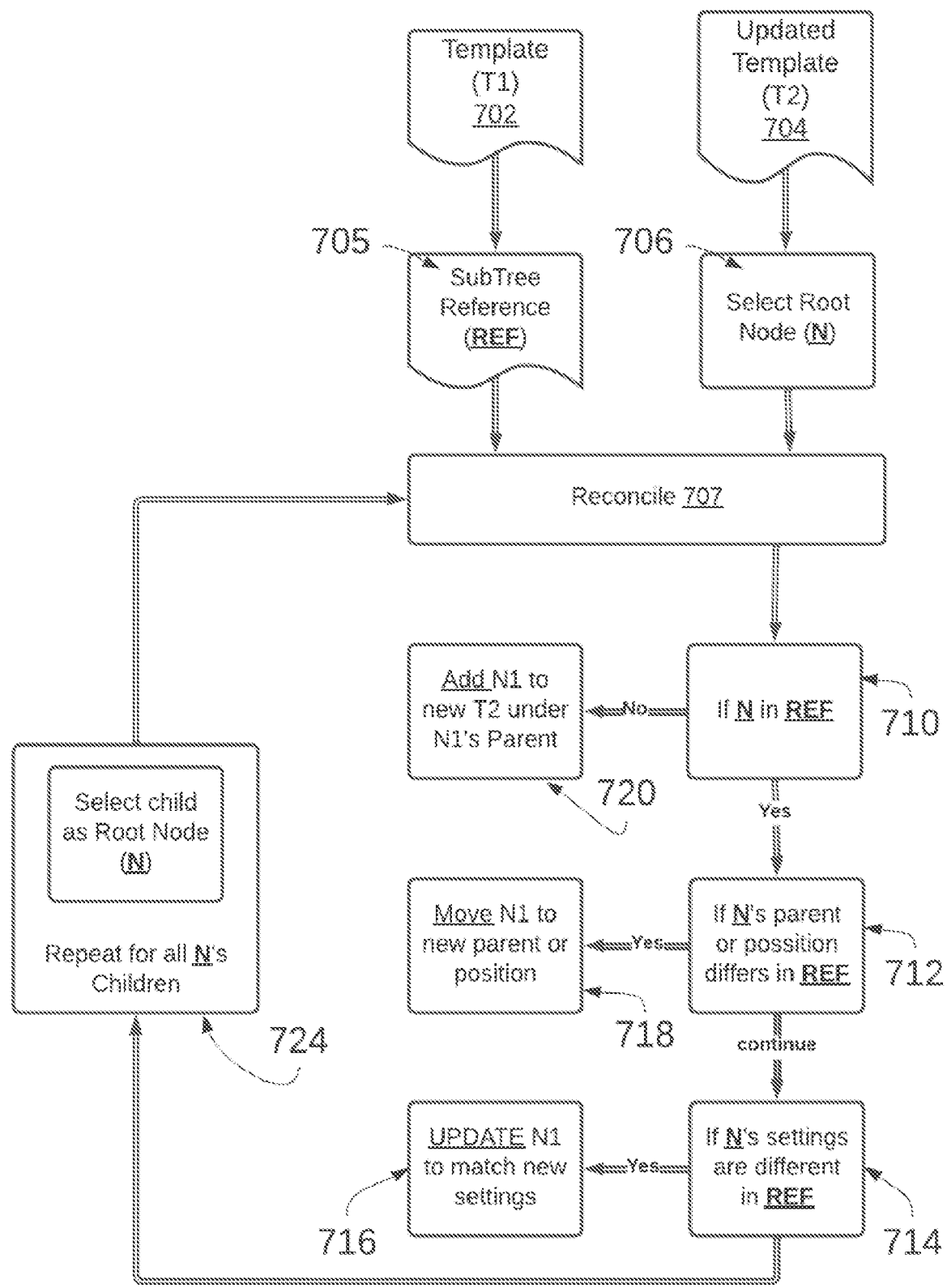
FIG. 7A shows an exemplary process for template reconciliation, according to one or more embodiments of the present subject matter.

FIG. 7A shows an exemplary process of updating a template with database operations such as add, move, and modify. According to some embodiments, the nodes/components at each hierarchical level of the two templates are respectively compared in multiple aspects, including its dependency, existence, position and content, etc.

As shown in FIG. 7A, after determining a triggering event, the system can compare the original template 702 (T1) with the updated/modified template 704 (T2) to summarize the changes and derive the least operations in synchronizing T1 and T2 in the relational database. According to some embodiments, the comparison operations are conducted in JSON data structures based on the template 702 and the updated template 704. Other nested data structures can be adopted to implement the present subject matters.

At step 705, the system can generate Subtree References (REF) of template 702. For example, the subtree of node or component 001 is {002, 004, 005}. At step 706, the system can select root node (N) of updated template 704 for comparison. At step 707, the system can compare the selected nodes from both templates in JSON data structures. At step 710, the system can determine that the Root Node (N) is absent in Subtree Reference (REF). Accordingly, at step 720, the system can generate an Add operation to add N1 to template 702 under N1's parent node, directly in the database. In other words, the add operation can create a node table N1 in relation with the parent node table in the database of template 702. When the Root Node (N) is present in Subtree Reference (REF), the system can proceed to step 712.

At step 712, when N's parent position or N's position are different from those of in REF, the system can proceed to step 718, which can generate a Move operation to change the node's "position" parameter in the corresponding table. When such node or parent positions remain the same, the system can proceed to step 714.

At step 714, the system can compare the settings of the selected Root Node (N) with the selected Subtree Reference (REF). When N's settings vary from those of REF's, at step 716, the system can modify the settings parameters of the corresponding nodes in the relational database for template 702. For example, the color or content of a block that has changed in N's settings can lead to the modification of the settings in the relevant table for template 702.

When N's settings are the same as those of REF's, at step 724, the system can proceed to report all the above steps for all and each of N's child nodes. For example, the system can select a child node of N as a sub Root Node (N), and compare it with Subtree Reference (REF) from steps 707-724, as herein described. As such, the system can generate one or more Add, Move and Modify operations to synchronize the template 702 with the updated template 704 in the relational database.

Figure 7B:
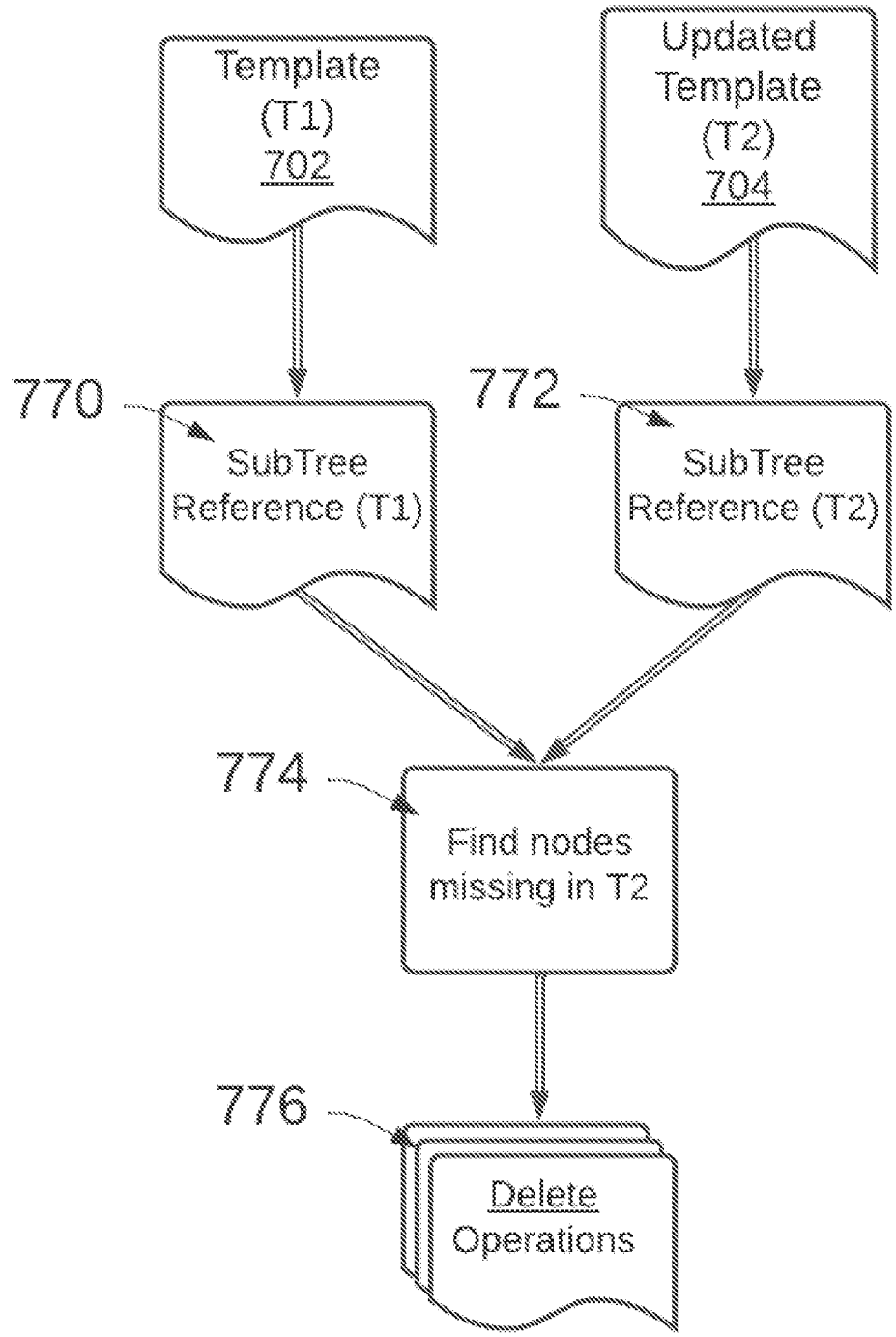
FIG. 7B shows another exemplary process for template reconciliation, according to one or more embodiments of the present subject matter.

FIG. 7B shows an exemplary process of updating a template with database operations such as a delete. According to some embodiments, the system can generate JSON data structures based on template 702 and the updated JSON data structures based on the updated template 704 through encoding processes.

After determining a triggering event, the system can compare, at each subtree reference level, the original template 702 (T1) with the updated/modified template 704 (T2) to derive one or more deletion to update T1 in the relational database.

At step 770, the system can generate Subtree References (REF) of template 702. For example, the subtree of node or component 001 is {002, 004, 005}. At step 772, the system can generate Subtree References (REF) of template 704. For example, the subtree of node or component 001 is {002, 004}. At step 774, the system can compare the subtrees of the two templates and determine missing nodes in template 704. For example, node 005 is missing in the REF of template 704. Accordingly, at step 776, the system can generate an operation to delete the database table of node 005 in the relational database of template 702.

Figure 8:
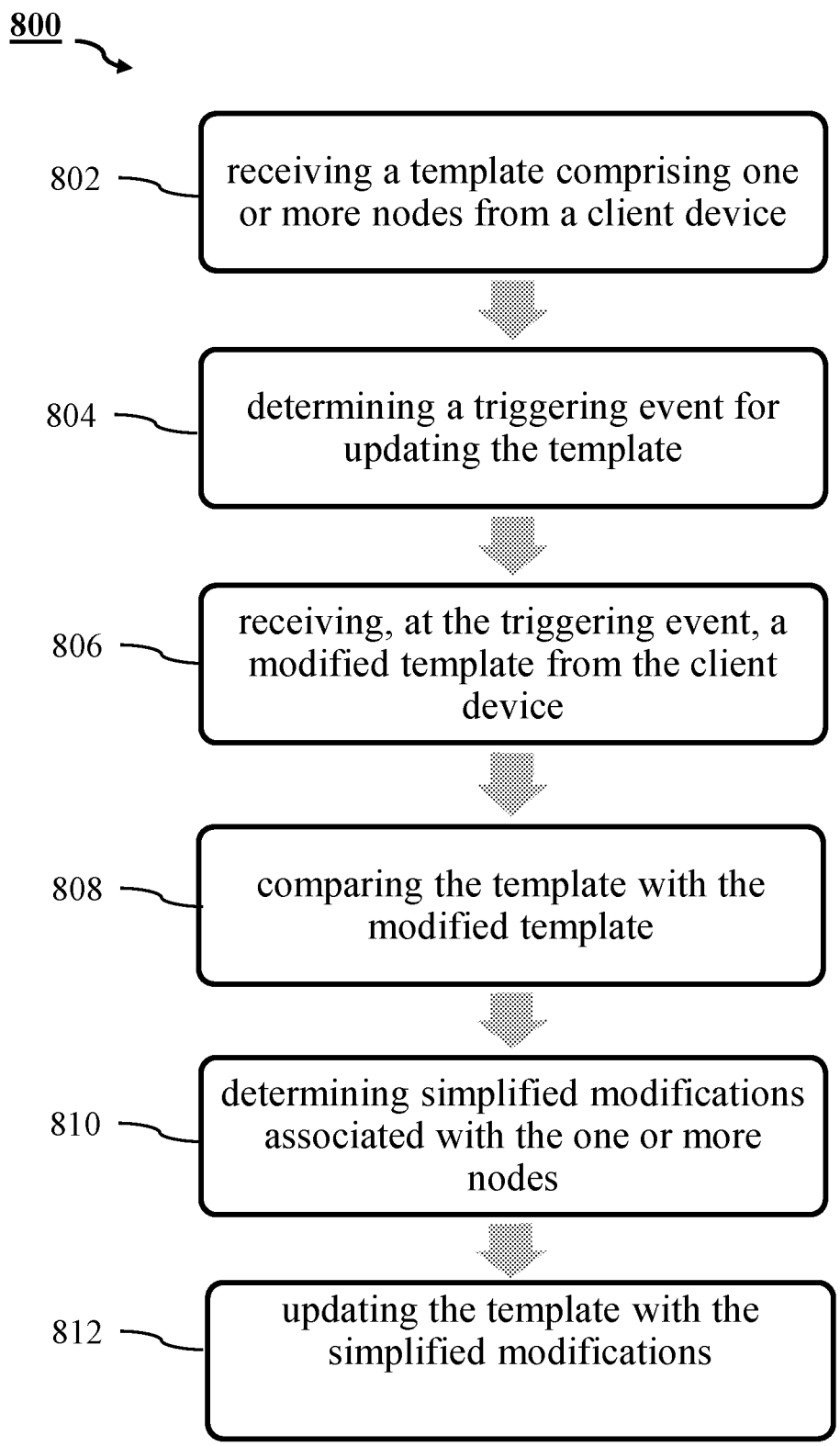
FIG. 8 shows another exemplary process for template reconciliation, according to one or more embodiments of the present subject matter.

FIG. 8 shows an exemplary process 800 for template reconciliation. At step 802, the system can receive a template comprising one or more components. A template can be stored a relational database via normalized and related data tables, such as body, sections, rows, columns, blocks and sub-blocks. When being rendered as an email, relevant data of the template can be converted into a computer-compiled HTML, web page showing the embedded components, such as sections and blocks. According to some embodiments, a component is a pre-defined structure that can be represented in both the relational database and in the email editor that can be rendered into HTML and configured by a client device. According to some embodiments, the system can generate nested data structures such as JSON data structures based on the original template in an encoding process. The JSON data structure can be a serialized nested JSON structure containing the normalized form of the template consisting of nested sections, blocks, subblocks, settings, positions, etc.

According to some embodiments, the email template can be marketing emails that can directly deliver relevant content to a customer. Furthermore, these marketing emails can be generated by modifying a template email according to various factors such as the specific offering or the customer's previous behavior data.

According to some embodiments, the system can comprise a template management server that further comprises a number of modules to implement functions of the present subject matter. According to some embodiments, the template management server can implement functions related to process, for example, template modification requests, template comparison, triggering event, and template reconciliation.

During a modification process, the system can receive one or more modification requests to change the template via the email editor. The one or more modification requests generate a modified template in JSON data structure. These modifications can be one or more of a deletion, an addiction, a move, or an edition of a component of the template. The system can retain implementing these modification requests in the relational database until a triggering event is determined.

At step 804, the system can determine a triggering event for updating the template. According to some embodiments, a triggering event can be an explicit save request sent by a user, e.g., by choosing a save option on the display. In another example, an explicit save request can be entered via a speech-enabled computer interface. According to some embodiments, a triggering event can be an implied save request such as a predetermined amount of time, e.g., every 5 or 10 minutes. In addition, a triggering event can also be a major modification that is predetermined or dynamically determined by the system. For example, a major modification can be a series of modifications that have operated on more than 30% of the components. According to some embodiments, a triggering event can be determined by a hybrid of various factors higher than a threshold, wherein the threshold value can be empirically predetermined or dynamically adapted.

At step 806, upon determining the trigger event, the system can receive a modified template in JSON or in a nested data structure from the client device. The modified template is the resulted template from one or more modification requests. For example, the modified template can be the updated JSON data structure 136 in FIG. 1B.

At step 808, the system can compare the template with the modified template in JSON. The system can, via a template comparison unit, compare the original template with the modified template. According to some embodiments, at each component level, the system can compare a subtree reference of an original template with a selected root node or a subtree reference of the updated template. The comparison can be conducted at each hierarchical level of the respective components in the template and the modified template, as shown in FIGS. 7A and 7B.

At step 810, the system can determine one or more simplified modifications between the two templates. As shown in FIGS. 7A and 7B, by the subtree comparison, the template management server can derive one or more simplified modifications in the relational database to implement the modification requests. The simplified modifications comprise at least one of an addiction, a deletion, a move or an edition of a component, which correspond to one or more modifications of the data tables in the relational database.

The simplified modifications can be the least database operations to synchronize the template with the modified template. According to some embodiments, the simplified modifications can comprise less operations than the original modification requests. For example, during a back-and-forth editing process, a block can be added to a template, then momentarily deleted, and later added back. In a conventional template editing approach, each temporary operation, i.e., adding, deleting and re-adding of the block, triggers a corresponding and traced database operation of the template management server.

By contrast, the template management server of the present subject matter does not initiate modifications until a triggering event for saving is detected. By directly comparing the original template with the final, modified version in JSON or a nested data structure, the template management server can derive simplified and direct modifications, i.e., an addition operation only, from the multiple modification requests. This can reduce the unnecessary deletion operation at the server in the back-and-forth edition, thus improving the computing and network efficiency.

In addition, by directly comparing the original template with the relatively final, modified version in JSON or a nested data structure, the template management server can enumerate the simplest or the least database operations to update the original template instantaneously in a collective manner, in contrast with the constant and frequent savings at the template management server in a traditional approach. In other words, these least operations can reduce the frequent or redundant operations while the modifications are happening.

Furthermore, according to some embodiments, during the template reconciliation, the system can automatically generate scripts, e.g., move, delete, update, etc., to update the templet with the simplified modifications in a short amount of time.

At step 812, the system can update the template by applying simplified modifications in the database. Furthermore, according to some embodiments, during the template reconciliation, the system can automatically generate scripts to instantaneously update templet with the one or more simplified modifications. As shown in FIGS. 4A-4E and FIGS. 5A-5B, a modification list comprising scripts or operations to implement the simplified modifications can be generated.

According to some embodiments, the system can enable joint editing of the template by more than one editor or client device. For example, the original template can be sent from a first client device, whereas the modification requests, as well as the modified template, can be sent from a second client device. According to some embodiments, after the template is updated, the system can transmit the modified template to the first client device and the second client device.

According to some embodiments, the template comparison and operation generation can be performed by a client device. For example, the client device can compare the template with the modified template to determine the simplified operations to implement the modification requests, and transmit the simplified operations to a template management server. Upon receiving the operations, the template management server can synchronize, in the relational database, the template by applying the one or more simplified operations to the template.

Figure 9A:
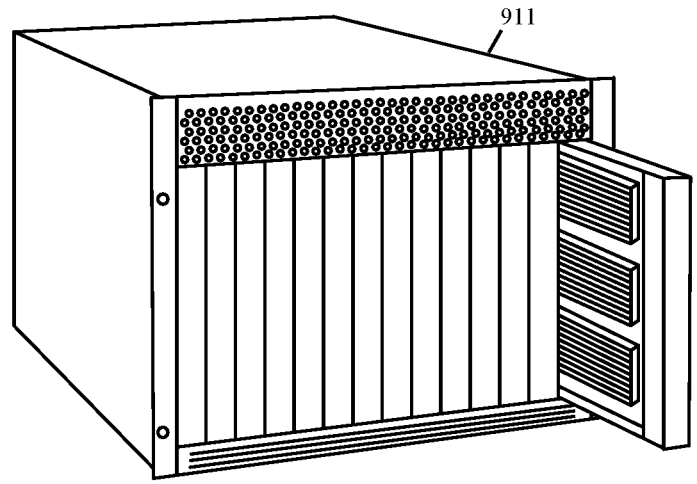
FIG. 9A shows a server system of rack-mounted blades, according to one or more embodiments of the present subject matter.

FIG. 9A shows a server system of rack-mounted blades for implementing the present subject matter. Various examples are implemented with cloud servers, such as ones implemented by data centers with rack-mounted server blades. FIG. 9A shows a rack-mounted server blade multiprocessor server system 911. Server system 911 comprises a multiplicity of network-connected computer processors that run software in parallel.

Figure 9B:
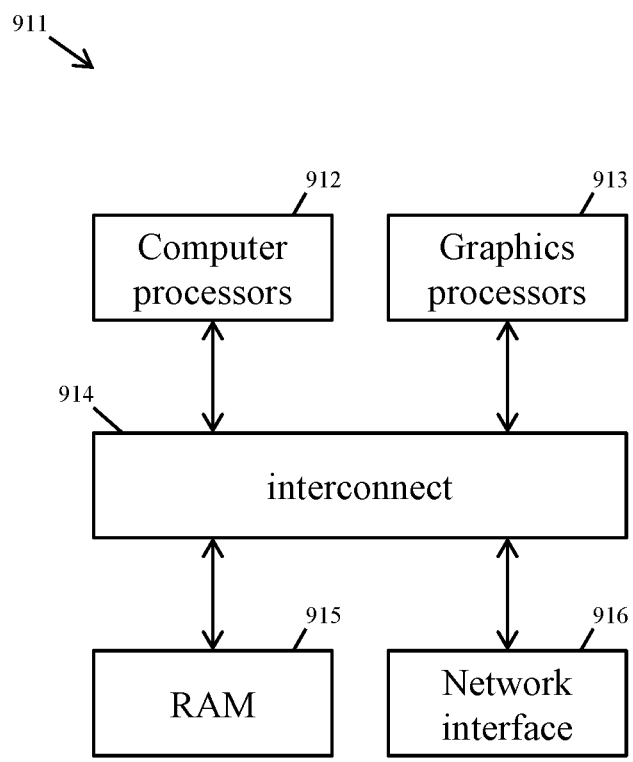
FIG. 9B shows a diagram of a networked data center server, according to one or more embodiments of the present subject matter.

FIG. 9B shows a diagram of a server system 911. It comprises a multicore cluster of computer processors (CPU) 912 and a multicore cluster of the graphics processors (GPU) 913. The processors connect through a board-level interconnect 914 to random-access memory (RAM) devices 915 for program code and data storage. Server system 911 also comprises a network interface 916 to allow the processors to access the Internet, non-volatile storage, and input/output interfaces. By executing instructions stored in RAM devices 915, the CPUs 912 and GPUs 913 perform steps of methods described herein.

Figure 10A:
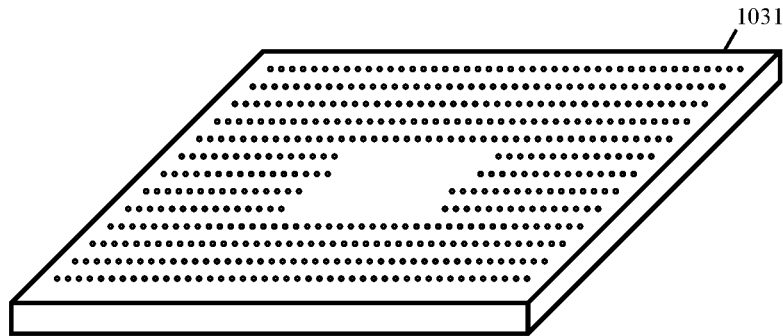
FIG. 10A shows a packaged system-on-chip device, according to one or more embodiments of the present subject matter.

FIG. 10A shows the bottom side of a packaged system-on-chip device 1031 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 10B:
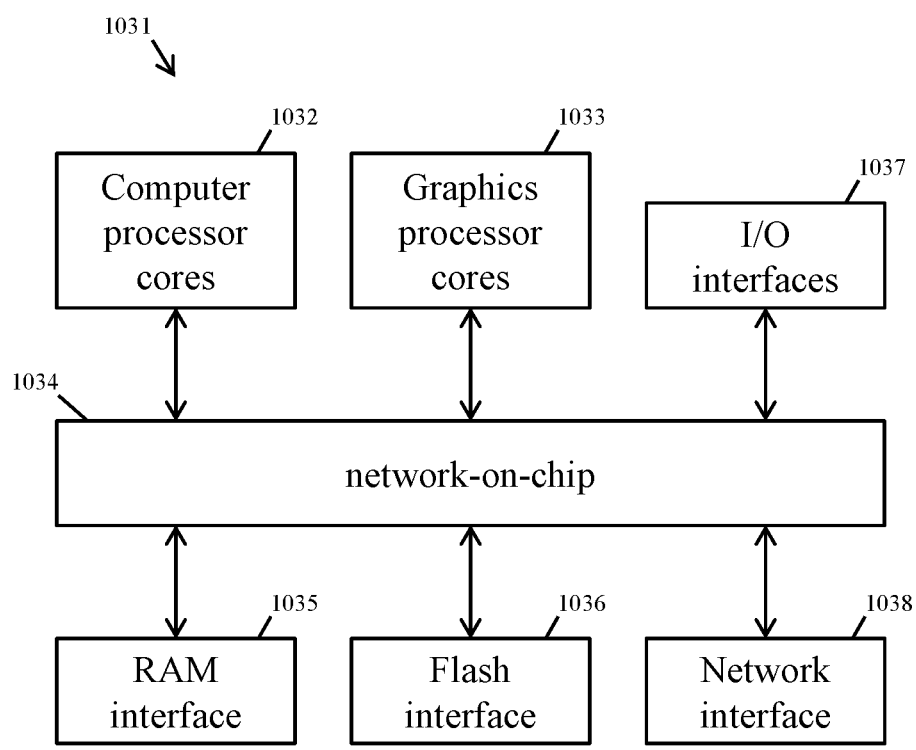
FIG. 10B shows a block diagram of a system-on-chip, according to one or more embodiments of the present subject matter.

FIG. 10B shows a block diagram of the system-on-chip 1031. It comprises a multicore cluster of computer processor (CPU) cores 1032 and a multicore cluster of graphics processor (GPU) cores 1033. The processors connect through a network-on-chip 1034 to an off-chip dynamic random access memory (DRAM) interface 1035 for volatile program and data storage and a Flash interface 1036 for non-volatile storage of computer program code in a Flash RAM non-transitory computer readable medium. SoC 1031 also has a display interface for displaying a graphical user interface (GUI) and an I/O interface module 1037 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1031 also comprises a network interface 1038 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1035 or Flash devices through interface 1036, the CPU cores 1032 and GPU cores 1033 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method of template modification, the method comprising:
   receiving, at a template management server, a template comprising one or more components from a client device, wherein the template is stored at the template management server in a relational database, and wherein the one or more components are organized in a number of hierarchical levels;
   receiving, at the client device, one or more original modifications to change the template, wherein the one or more original modifications generate a modified template at the client device;
   determining a triggering event has occurred, wherein the triggering event is caused by the one or more original modifications comprising at least one of an update, an addition, a deletion, or a move of a component in the relational database;
   receiving, at the template management server, the modified template from the client device, wherein the modified template reflects changes made by the one or more original modifications;
   comparing respective components, at each hierarchical level of the number of hierarchical levels, of the stored template at the template management server and the modified template from the client device;
   generating one or more simplified modifications to implement the one or more original modifications on the stored template at the template management server, wherein the one or more simplified modifications are least operations to be applied in the relational database to implement the changes made by the one or more original modification, and wherein the one or more simplified modifications comprise less number of data operations than the one or more original modifications; and
   synchronizing, at the template management server, the template in the relational database by applying the one or more simplified modifications to the one or more components of the template.

2. The computer-implemented method of claim 1, wherein the one or more components comprise first-level components, second-level components, and third-level components in the number of hierarchical levels.

3. The computer-implemented method of claim 1, wherein synchronizing the template further comprises:
   generating operations to be applied in the relational database to update the one or more components of the template with the one or more simplified modifications.

4. The computer-implemented method of claim 1, further comprising:
   generating a modification list comprising operations to be applied in the relational database to implement the one or more simplified modifications; and
   synchronizing, in the relational database, the template with the modified template by applying the modification list to the template.

5. The computer-implemented method of claim 1, wherein the triggering event comprises a save request received by the template management server.

6. The computer-implemented method of claim 1, wherein the triggering event comprises a predetermined period of time.

7. The computer-implemented method of claim 1, wherein the triggering event comprises a major modification of the template.

8. The computer-implemented method of claim 1, further comprising:
   generating corresponding nested data structures based on the template and the modified template, wherein the comparing the template with the modified template is conducted through the corresponding nested data structures.

9. The computer-implemented method of claim 1, wherein the one or more simplified modifications comprise at least one of an update, an addition, a deletion, or a move of a component in the relational database.

10. A computer-implemented method of template modification, the method comprising:
    receiving, at a template management server, a template comprising one or more components from a client device, wherein the template is stored at the template management server in a relational database, and wherein the one or more components are organized in a number of hierarchical levels;
    receiving, at the client device, one or more original modifications to change the template, wherein the one or more original modifications generate a modified template at the client device;
    determining a triggering event for updating the template, wherein the triggering event is caused by the one or more original modifications comprising at least one of an update, an addition, a deletion, or a move of a component in the relational database;
    comparing respective components, at each hierarchical level of the number of hierarchical levels, of the stored template at the template management server and the modified template from the client device;
    determining one or more simplified modifications associated with the one or more components of the template, wherein the one or more simplified modifications are least operations to be applied in the relational database to synchronize the template at the template management server with the modified template from the client device; and synchronizing, at the template management server, the template by applying the one or more simplified modifications to the one or more components of the template in the relational database.

11. The computer-implemented method of claim 10, wherein the template is received from a first client device, and the modified template is received from another client device that is different from the client device.

12. The computer-implemented method of claim 11, further comprising:
generating corresponding nested data structures based on the template and the modified template, wherein the comparing the template with the modified template is conducted through the corresponding nested data structures.

13. The computer-implemented method of claim 10, wherein the one or more components comprise first-level components, second-level components, and third-level components in the number of hierarchical levels.

14. The computer-implemented method of claim 10, wherein the triggering event is at least one of a save request from a client device, a predetermined period of time or a major modification of the template.

15. The computer-implemented method of claim 1, wherein the one or more original modifications comprise a deletion operation of one component at a first hierarchical level of the relational database and an addition operation of the same component at a second hierarchical level of the relational database.

16. The computer-implemented method of claim 15, wherein the one or more simplified modifications comprise moving the same component from the first hierarchical level to the second hierarchical level of the relational database.

17. The computer-implemented method of claim 10, wherein the one or more original modifications comprise a deletion operation of one component at a first hierarchical level of the relational database and an addition operation of the same component at a second hierarchical level of the relational database.

18. The computer-implemented method of claim 17, wherein the one or more simplified modifications comprise moving the same component from the first hierarchical level to the second hierarchical level of the relational database.

* * * * *